United States Patent
Newbold et al.

(10) Patent No.: US 11,660,994 B2
(45) Date of Patent: May 30, 2023

(54) TABLE ASSEMBLY WITH LEVELING ASSEMBLY FOR PASSENGER SEAT

(71) Applicant: Safran Seats USA LLC, Gainesville, TX (US)

(72) Inventors: Tyler Newbold, Sherman, TX (US); Klay Ethan Gilbert, Lindsay, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/466,840

(22) Filed: Sep. 3, 2021

(65) Prior Publication Data

US 2023/0077224 A1 Mar. 9, 2023

(51) Int. Cl.
*B60N 3/00* (2006.01)
*B64D 11/06* (2006.01)
*B61D 33/00* (2006.01)

(52) U.S. Cl.
CPC .......... *B60N 3/002* (2013.01); *B64D 11/0638* (2014.12); *B61D 33/00* (2013.01)

(58) Field of Classification Search
CPC .... B60N 3/002; B64D 11/0638; B61D 33/00; A47C 7/68; A47C 7/624
USPC ...................................... 297/161; 108/47, 46
See application file for complete search history.

(56) References Cited

U.S. PATENT DOCUMENTS

| 1,731,293 A | 10/1929 | Chapman | |
|---|---|---|---|
| 2,687,336 A * | 8/1954 | Smith .................... | B60N 3/004 108/34 |
| 3,368,842 A | 2/1968 | Polsky | |
| 4,944,552 A * | 7/1990 | Harris ................ | B64D 11/0638 297/145 |
| 5,221,070 A | 6/1993 | Heilmer | |

(Continued)

FOREIGN PATENT DOCUMENTS

| EP | 2930108 A1 | 10/2015 |
|---|---|---|
| FR | 2914245 A1 | 10/2008 |

(Continued)

OTHER PUBLICATIONS

Europe Patent Application No. 22189308.4, Office Action (Communication pursuant to Rule 69 EPC), dated Mar. 14, 2023.

(Continued)

*Primary Examiner* — Jose V Chen
(74) *Attorney, Agent, or Firm* — Kilpatrick Townsend & Stockton LLP

(57) ABSTRACT

Described are table assemblies for a passenger seat. The table assemblies may include a paddle arm, a table support, and a leveling assembly. A first end of the paddle arm may include a paddle arm tab extending outwards from the paddle arm. The table support may be pivotably connected to the first end and configured to support a table. The table support may include a top side that defines a latch receiving area. The leveling assembly may include a latch and a latch adjuster. The latch may be pivotably supported on the table support within the latch receiving area. The latch adjuster may selectively engage a first end of the latch and control a tilt angle range of the table support. The latch adjuster may engage the latch at a first tilt angle, and the paddle arm tab may engage the latch at a second tilt angle.

20 Claims, 6 Drawing Sheets

(56) References Cited

U.S. PATENT DOCUMENTS

| | | | |
|---|---|---|---|
| 5,511,493 A * | 4/1996 | Kanehl, Jr. | B60N 3/001 108/47 |
| 5,547,247 A | 8/1996 | Dixon | |
| 5,588,697 A * | 12/1996 | Yoshida | A47B 13/16 297/188.17 |
| 6,220,658 B1 | 4/2001 | Lukawski | |
| 6,375,257 B1 * | 4/2002 | Wooding | A47C 7/70 248/278.1 |
| 6,427,957 B1 * | 8/2002 | Finneman | F16M 11/2064 248/185.1 |
| 6,520,091 B1 * | 2/2003 | Dettmers | A47B 5/006 108/42 |
| 7,726,732 B1 * | 6/2010 | Keating | A47C 7/705 297/161 |
| 8,672,400 B2 | 3/2014 | Henderson | |
| 9,044,093 B1 | 6/2015 | Pan | |
| 10,172,467 B1 | 1/2019 | Shih | |
| 2003/0188672 A1 * | 10/2003 | Parent | A47B 5/006 108/134 |
| 2007/0227407 A1 * | 10/2007 | Cartensen | B61D 37/006 108/33 |
| 2008/0073946 A1 * | 3/2008 | Maione | A47C 7/705 297/161 |
| 2008/0197678 A1 | 8/2008 | Olarte | |
| 2009/0008969 A1 | 1/2009 | Caturla et al. | |
| 2009/0026812 A1 | 1/2009 | Figueras Mitjans | |
| 2010/0090504 A1 | 4/2010 | Brink | |
| 2010/0243839 A1 * | 9/2010 | Westerink | B64D 11/0638 248/276.1 |
| 2010/0319588 A1 * | 12/2010 | Hanna | B60N 3/001 108/20 |
| 2011/0067606 A1 | 3/2011 | Sundarrao | |
| 2011/0101740 A1 | 5/2011 | Koh | |
| 2012/0306241 A1 * | 12/2012 | Winter | B60N 2/767 108/44 |
| 2014/0110977 A1 | 4/2014 | Madrigal | |
| 2014/0300148 A1 * | 10/2014 | Frost | B64D 11/0638 297/173 |
| 2014/0312669 A1 * | 10/2014 | Zheng | B64D 11/00 248/185.1 |
| 2018/0170549 A1 * | 6/2018 | Jussli | B64D 11/0638 |
| 2018/0279790 A1 | 10/2018 | Pozzi | |
| 2018/0339630 A1 * | 11/2018 | Akaike | B64D 11/0638 |
| 2019/0351799 A1 | 11/2019 | Kim et al. | |
| 2020/0215950 A1 * | 7/2020 | Gomez | B60N 2/6027 |
| 2021/0120961 A1 | 4/2021 | Griepentrog | |
| 2022/0227277 A1 | 7/2022 | Dueker | |

FOREIGN PATENT DOCUMENTS

| | | | |
|---|---|---|---|
| GB | 2598170 A | 2/2022 | |
| JP | 2011079436 A * | 4/2011 | A47B 5/04 |

OTHER PUBLICATIONS

Europe Patent Application No. 22189308.4, Extended Search Report, dated Jan. 27, 2023.

* cited by examiner

TABLE ASSEMBLY WITH LEVELING ASSEMBLY FOR PASSENGER SEAT

FIELD OF THE INVENTION

The field of the invention relates to passenger seats, and, more particularly, to table assemblies for passenger seats.

BACKGROUND

Passenger vehicles, such as aircraft, buses, trains, ships, and automobiles, often include one or more passenger seats in which passengers may be seated or otherwise use during travel. A passenger seat may include a table assembly that may be used for various purposes including deploying for holding food, stowing for allowing passengers or other suitable individuals to move with respect to the passenger seat, and the like. The table assembly, when deployed, may not be level, which may lead to discomfort with respect to the passenger. Additionally, when being stowed, the table assembly may injure the passenger or other individual associated with the passenger seat, for example by using a bulky hinge attaching the table assembly to the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a table assembly for a passenger seat may include a paddle arm, a table support, and a leveling assembly. The paddle arm may include a first end and a second end opposite from the first end, and the first end may include a paddle arm tab extending outwards from the paddle arm. The table support may be pivotably connected to the first end of the paddle arm and may be configured to support a table of the table assembly. The table support may include a top side and a bottom side, and the top side may define a latch receiving area. The leveling assembly may include a latch and a latch adjuster. The latch may include a first end and a second end. The latch may be pivotably supported on the table support within the latch receiving area between the first end and the second end of the latch. The latch adjuster may be configured to selectively engage the first end of the latch. The latch adjuster may be configured to control a tilt angle range of the table support relative to the paddle arm. The latch adjuster may be configured to engage the latch proximate to the first end of the latch at a first tilt angle within the tilt angle range. The paddle arm tab may be configured to engage the latch proximate to the second end of the latch at a second tilt angle within the tilt angle range.

In some embodiments, the table assembly may include the table that may include a first side end, a second side end, a top side, and a bottom side. The table support may be connected to the bottom side of the table between the first side end and the second side end, and the top side of the table support may be positioned adjacent to the bottom side of the table. In certain embodiments, the bottom side of the table support may extend parallel to the top side of the table. In various embodiments, the paddle arm tab may include an upper surface, and the latch may include an upper surface and a lower surface. The upper surface of the paddle arm tab may contact the lower surface of the latch. In some embodiments, at the second tilt angle, the upper surface of the paddle arm tab may contact the lower surface of the latch between the bottom side of the table and the bottom side of the table support.

In various embodiments, the latch may include a top side and a bottom side, and the latch adjuster may engage the bottom side of the latch proximate to the first end of the latch at the first tilt angle. The paddle arm tab may engage the bottom side of the latch proximate to the second end at the second tilt angle. In certain embodiments, the bottom side of the latch may include a recess proximate to the first end, and the latch adjuster may engage the bottom side of the latch within the recess. In various embodiments, the paddle arm may include a body comprising the first end and the second end, and the paddle arm tab may extend from the body such that the paddle arm tab may not be parallel to the paddle arm. In some embodiments, the table assembly may include a support pin pivotably supporting the latch on the table support. In certain embodiments, the first tilt angle may be a maximum tilt angle downwards of the table support relative to the paddle arm, and the second tilt angle may be a maximum tilt angle upwards of the table support relative to the paddle arm.

In various embodiments, the latch adjuster may include a set screw threadably engaged with the table support, and the set screw may be adjustable such that a height of the set screw within the latch receiving area is adjustable. In some embodiments, the table support may be attached to the paddle arm via a friction hinge. In various embodiments, the table support may include a first end and a second end. The latch may be pivotably supported on the table support between the first end and the second end of the table support, and the paddle arm may be pivotably connected to the table support between the first end and the second end of the table support. In some embodiments, the table support may include a first mating location between the latch and the first end of the table support and a second mating location between the latch and the second end of the table support. The first mating location and the second mating location may each be configured to engage the table. In certain embodiments, the passenger seat may include an armrest and the table assembly in which the second end of the paddle arm may be pivotably connected to the armrest.

According to certain embodiments of the present invention, a table assembly for a passenger seat may include a table support and a leveling assembly. The table support may be connectable with a paddle arm and may be configured to support a table of the table assembly. The table support may include a top side and a bottom side, and the top side may define a latch receiving area. The leveling assembly may include a latch and a latch adjuster. The latch may include a first end and a second end, and the latch may be pivotably supported on the table support within the latch receiving area between the first end and the second end of the latch. The latch adjuster may selectively engage the first end of the latch, and the latch adjuster may control a tilt angle range of table support relative to the paddle arm. The latch adjuster may be engaged proximate to the first end of the latch at a first tilt angle within the tilt angle range. The latch adjuster may be disengaged from the first end of the latch at a second tilt angle within the tilt angle range.

In some embodiments, the table assembly may include the paddle arm, and the paddle arm may include a first end and a second end opposite from the first end. The first end may include a paddle arm tab extending outwards from the paddle arm, and the paddle arm tab may be configured to engage the latch proximate to the second end of the latch at the second tilt angle.

According to certain embodiments of the present invention, a table assembly for a passenger seat may include a table, a table support, and a leveling assembly. The table may include a first side end, a second side end, a top side, and a bottom side. The table support may be connected to the bottom side of the table between the first side end and the second side end and connectable with a paddle arm. The table support may include a top side and a bottom side, and the top side may be positioned adjacent to the bottom side of the table and defines a latch receiving area. The leveling assembly may include latch and latch adjuster. The latch may include a first end and a second end, and the latch may be pivotably supported on the table support within the latch receiving area between the first end and the second end of the latch. The latch adjuster may selectively engage the first end of the latch, and the latch adjuster is configured to control a tilt angle range of table support relative to the paddle arm. The latch adjuster may engage the latch proximate to the first end of the latch at a first tilt angle within the tilt angle range. The latch adjuster may be disengaged from the first end of the latch at a second tilt angle within the tilt angle range.

In some embodiments, the table assembly may include the paddle arm, and the paddle arm may include a first end and a second end opposite from the first end. The first end may include a paddle arm tab extending outwards from the paddle arm, and the paddle arm tab may be configured to engage the latch proximate to the second end of the latch at the second tilt angle. In certain embodiments, the latch adjuster may include a set screw threadably engaged with the table support, and the set screw may be adjustable such that a height of the set screw within the latch receiving area is adjustable.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide table assemblies for passenger seats. While the table assemblies are discussed for use with aircraft seats, they are by no means so limited. Rather, embodiments of the table assemblies described herein may be used in passenger seats or other seats of any type or otherwise as desired.

Figure 1:
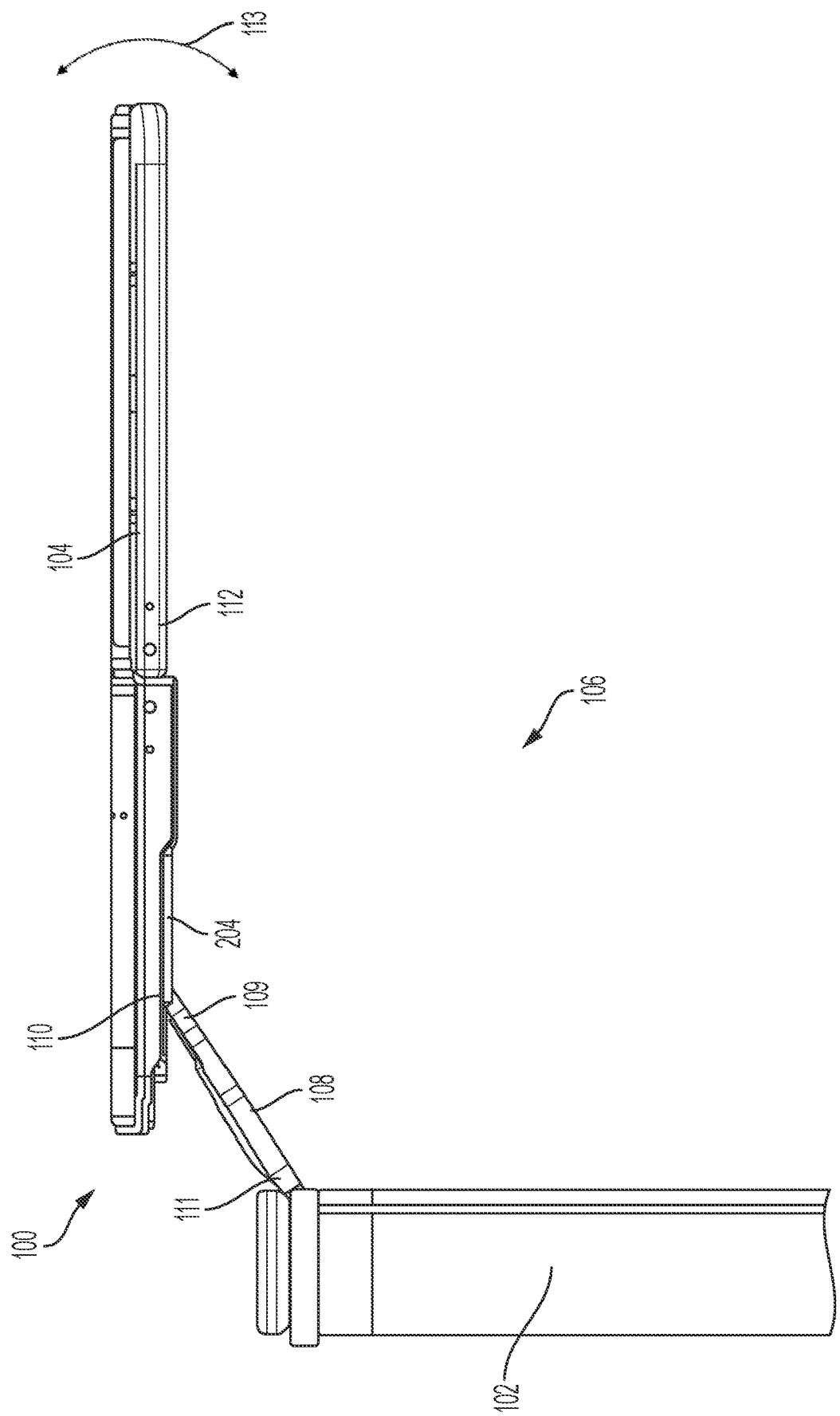
FIG. 1 is a schematic of a partial passenger seat according to certain embodiments of the present invention.
Figure 2:
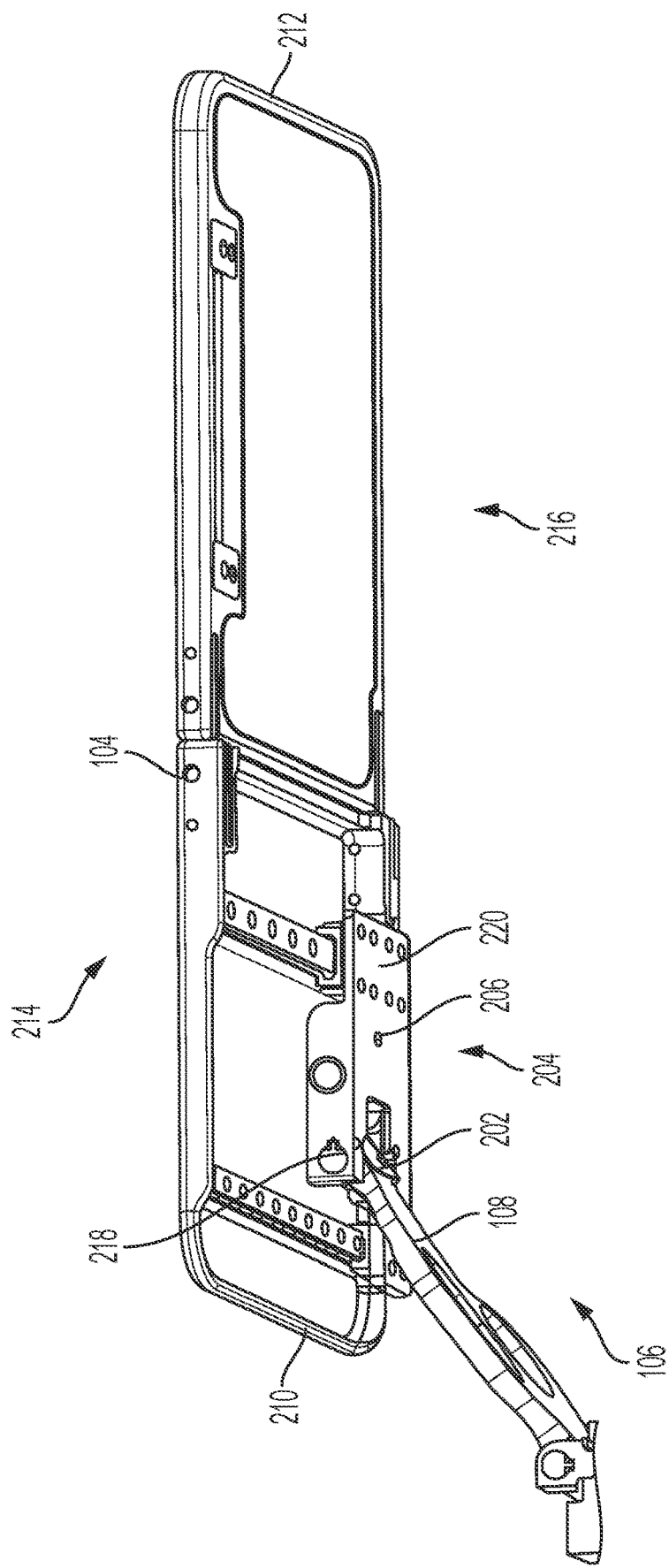
FIG. 2 is a bottom perspective view of the partial passenger seat of FIG. 1 according to certain embodiments of the present invention.

FIGS. 1 and 2 illustrate a partial passenger seat 100 according to certain embodiments of the present invention. The partial passenger seat 100 may include a subset of parts or components of a passenger seat that may be positioned in a passenger vehicle, such as an aircraft, train, and the like, and that may be used by a passenger or other individual associated with the passenger vehicle. The partial passenger seat 100 may include a passenger seat arm 102, and a table assembly 106 may be supported on and/or relative to the passenger seat arm 102. The portions or components of the table assembly 106 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. In certain embodiments, at least one portion of the table assembly 106 may optionally be constructed from a material that is different from the material used for another portion of the table assembly 106. In other embodiments, the components of the table assembly 106 may be constructed from the same material.

In various embodiments, the table assembly 106 includes a table 104, a table support 204, and a paddle arm 108. In various embodiments, and as discussed in detail below, the paddle arm 108 and table support 204 of the table assembly 106 may allow for the table 104 to tilt upwards and/or downwards (see arrow 113 in FIG. 1) to one or more tilt angles relative to the seat arm 102.

The table 104 may be used to support food or other items associated with a passenger or other suitable individual associated with the passenger seat. The particular table 104 illustrated should not be considered limiting, and in other embodiments the table 104 may be tables 104 with other shapes, sizes, features, etc. as desired.

The paddle arm 108 may be connected to or otherwise supported at support locations on various structures as desired, including but not limited to the passenger seat arm 102. In certain embodiments, the paddle arm 108 may optionally be pivotably connected to those support locations such that the table 104 may be stowed or deployed as desired and relative to the passenger seat arm 102. For example, the paddle arm 108 may allow for the table 104 to be stowed relative to the passenger seat arm 102 when the table 104 is not being used. In some embodiments, a passenger seat may include the passenger seat arm 102, which may include the armrest for the passenger seat, and the table assembly 106 described herein such that the second end 111 of the paddle arm 108 may be pivotably coupled to the passenger seat arm 102, the armrest, or other suitable component. Using the table assembly 106 to couple the table 104 to the passenger seat arm 102, or other suitable component of the passenger seat, may prevent or otherwise mitigate injuries to passengers or other suitable individuals when stowing or deploying the table 104.

The paddle arm 108 has a first end 109 and a second end 111 opposite the first end 109. As illustrated in FIG. 2, the paddle arm 108 includes a paddle arm tab 202, which may be positioned in the table support 204 and may selectively engage the table support 204 and/or a leveling assembly supported by the table support 204 at various tilt angles. As a non-limiting example, the paddle arm tab 202 may engage the table support 204 and/or leveling assembly at a maximum upwards tilt angle or a maximum downwards tilt angle. In some embodiments, and as discussed in greater detail below with reference to FIGS. 3-5, the movement and/or range of tilt angles may be adjustable via the paddle arm and/or other suitable components. For example, a latch adjuster 206 may be included in the leveling assembly or other suitable component. In these embodiments, the latch adjuster 206 may be adjusted inward or outward (upward or downward) relative to the table support 204 to define a range of tilt angles that the table 104 can move to. In some embodiments, adjusting the latch adjuster 206 inward may cause the table support 204 to sit at a lesser angle with respect to the paddle arm 108.

The table support 204 may be connected to the table 104 via suitable fasteners, which include but are not limited to screws, bolts, rivets or other mechanical or chemical fasteners. In certain embodiments, the table support 204 may be fixed relative to the table 104. As illustrated in FIG. 2, in some embodiments, the table support 204 may be pivotably connected proximate to the first end 109 of the paddle arm 108. The table support 204 may include a first end 218 and a second end 220. The table 104 may include a first side end 210, a second side end 212, a top side 214, and a bottom side 216. In various embodiments, the table support 204 may be connected to the bottom side 216 of the table 104 between the first side end 210 and the second side end 212 such that a top side of the table support 204 may be adjacent to the bottom side 216 of the table 104. In some non-limiting examples, a bottom side of the table support 204 may optionally extend parallel to the top side 214 of the table 104, although it need not in other embodiments.

The paddle arm 108 may be pivotably connected to the table support 204 (and thus the table 104) such that the table 104 is tiltable (arrow 113 in FIG. 1) relative to the paddle arm 108. In certain embodiments, the paddle arm 108 is pivotably connected to the table support 204 and table 104 at a location 110 that is offset from an edge of the table 104. In various embodiments, the location 110 may be may be closer to a center 112 of the table 104 than that of other tables. Coupling the table 104 at the location 110 may increase a stability or other suitable performance measure of the table 104 compared to the other tables.

Figure 3:
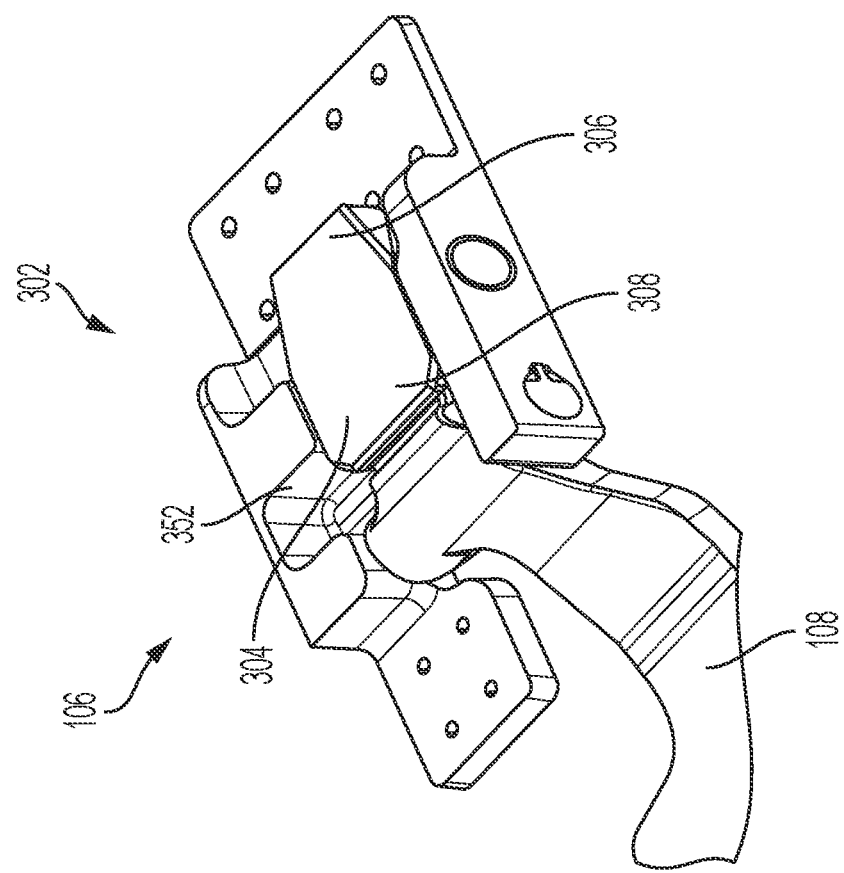
FIG. 3 is two perspective views of a table assembly according to certain embodiments of the present invention.
Figure 3:
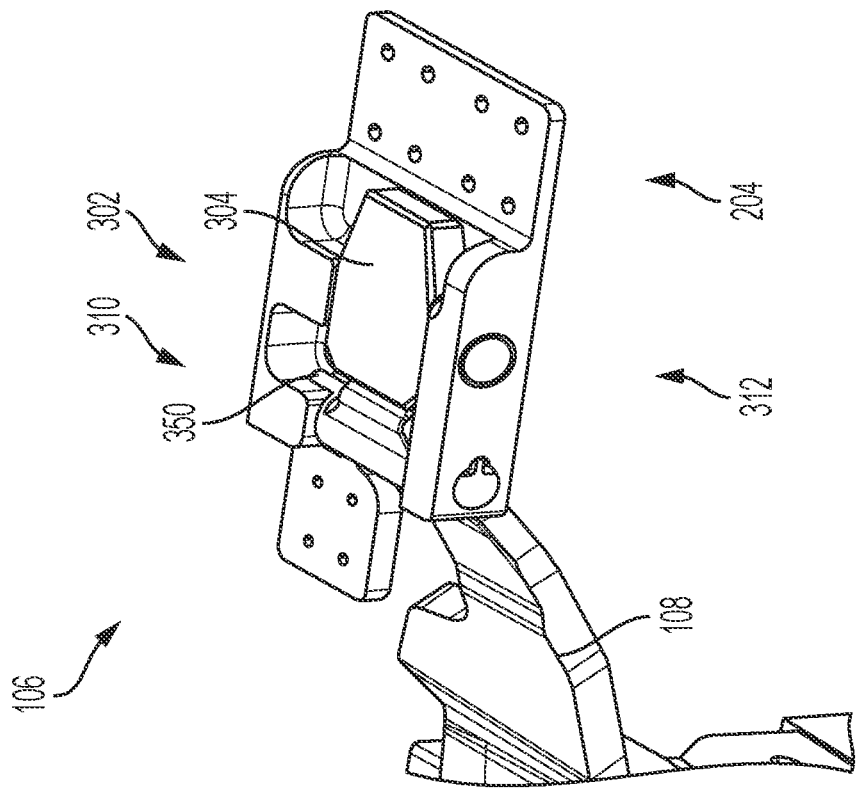
Figure 4:
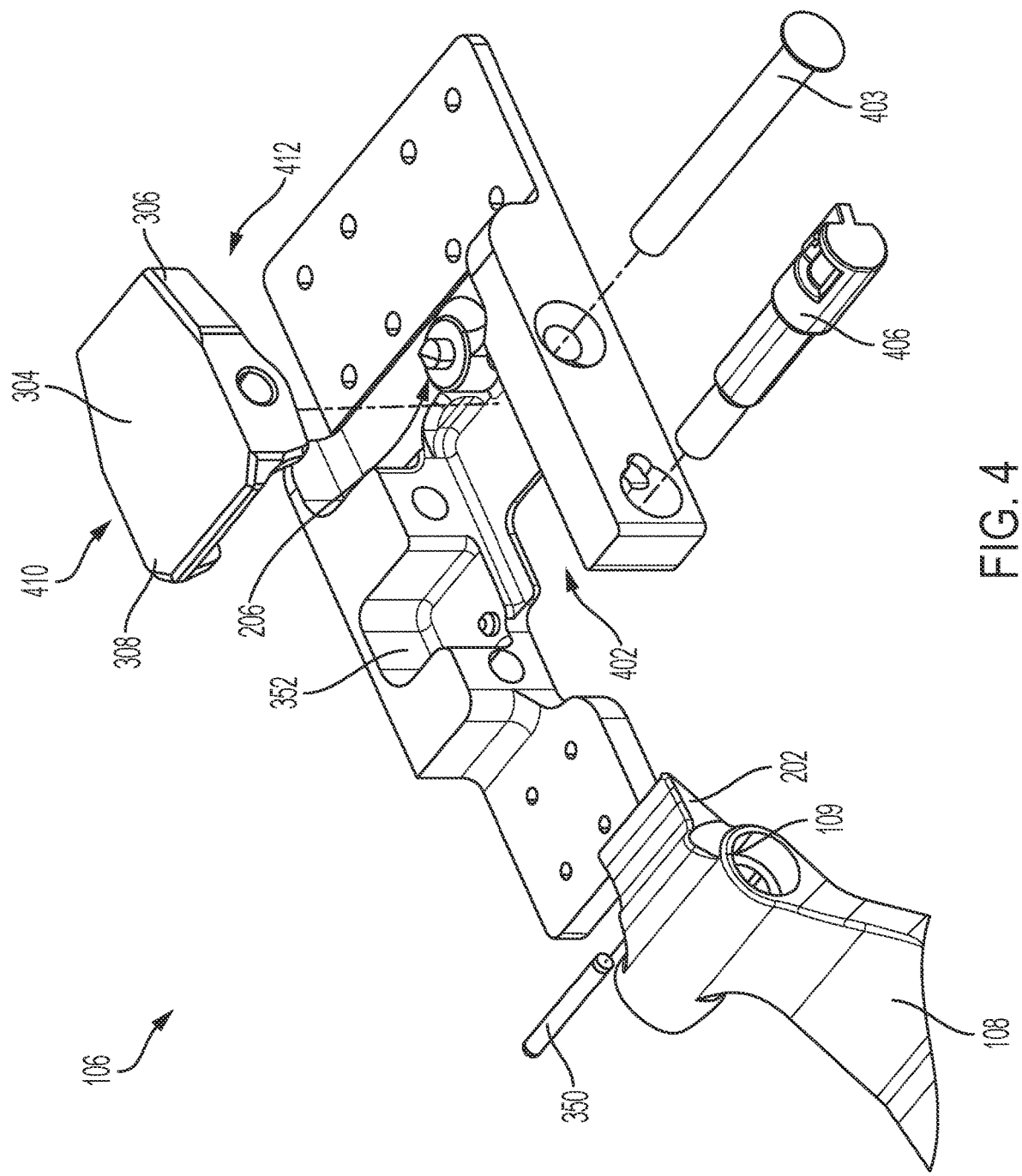
FIGS. 4 and 5 are exploded views of the table assembly of FIG. 3 according to certain embodiments of the present invention.
Figure 5:
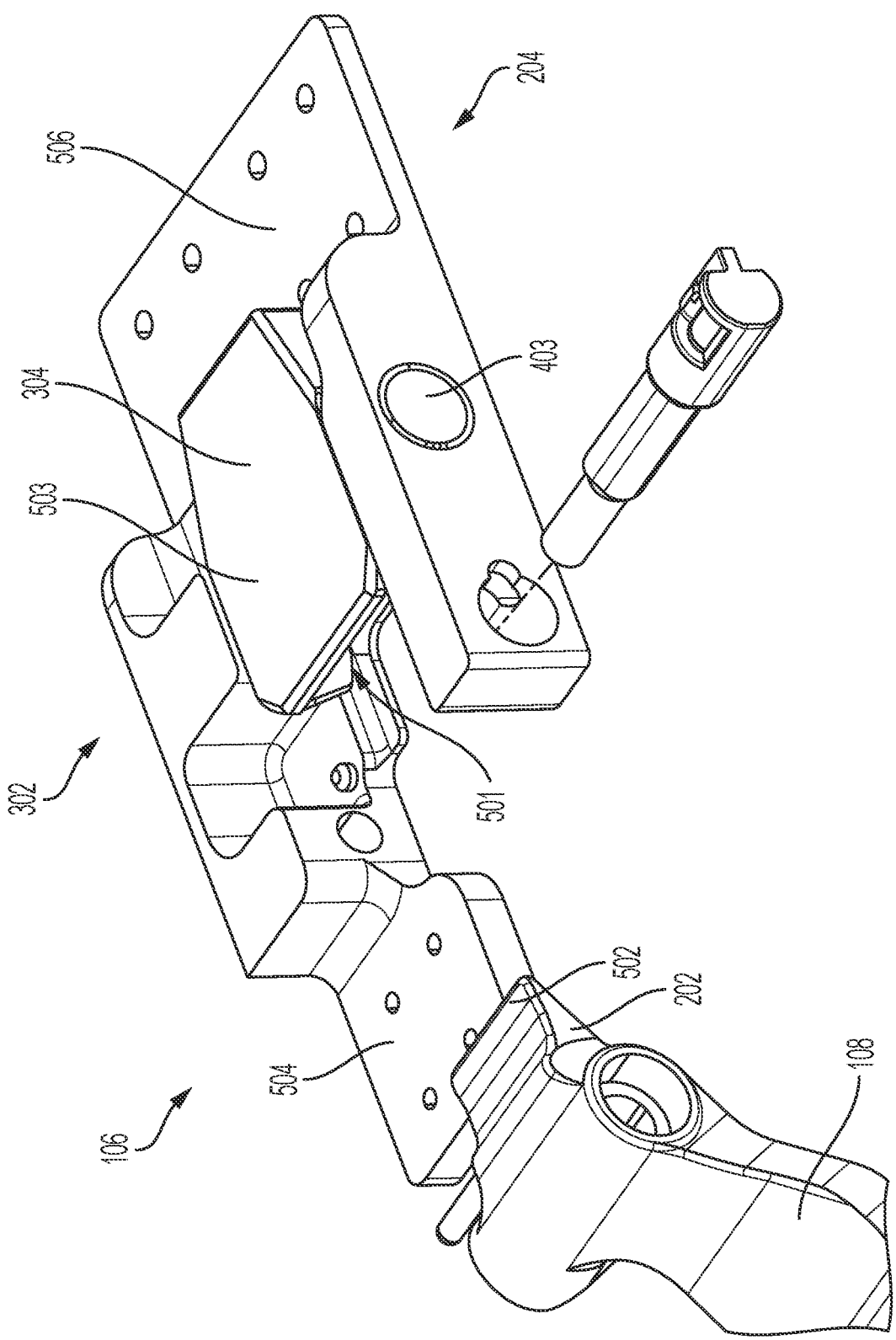

FIGS. 3-5 illustrate portions of the table assembly 106 in greater detail. As illustrated in FIGS. 3-5, in addition to the table 104 (not shown), the paddle arm 108, and the table support 204, the table assembly 106 includes a leveling assembly 302. In other embodiments, the table assembly 106 may include additional or fewer portions or pieces as desired.

As best illustrated in FIGS. 3-5, the leveling assembly 302 may include a latch 304 having a first end 306 and a second end 308 that is opposite the first end 306. Additionally, the latch 304 may include a top side 410, a bottom side 412, a lower surface 501, and an upper surface 503. Optionally, the bottom side 412 of the latch 304 may include a recess (see FIG. 6). When included, the recess may optionally be positioned proximate to the first end 306 of the latch 304 and that may allow the latch adjuster 206 to engage with the latch 304. In other embodiments, the recess may be omitted. The latch adjuster 206 may engage with the latch 304 to control a first tilt angle, within an allowable tilt angle range, of the table support 204 with respect to the paddle arm 108.

The latch 304 may be pivotably supported on the table support 204 between the first end 218 and the second end 220 of the table support 204. In certain embodiments, the table support 204 defines a latch receiving area 402 on a top side 310, which may be opposite a bottom side 312, of the table support 204. The latch 304 may optionally be pivotably supported within a latch receiving area 402. In certain embodiments, the latch 304 may be held in place in the latch receiving area 402 by a support pin 403 that may be inserted or removed to install or remove the latch 304, respectively. In some embodiments, the support pin 403 may pivotably support the latch 304 on the table support 204. The support pin 403 may include screws, bolts, rivets or other suitable mechanical fasteners. The paddle arm 108 may be coupled to the leveling assembly 302 via the latch 304. In some embodiments, the latch 304 may be used to pivotably connect the table support 204 and the paddle arm 108.

As best illustrated in FIGS. 4-5, the paddle arm tab 202 may extend outward from the first end 109 of the paddle arm 108. In some embodiments, the paddle arm tab 202 may extend from the body of the paddle arm 108 in a direction not parallel to a direction of the body of the paddle arm 108. The paddle arm tab 202 may be positioned within the latch 304, as illustrated in FIG. 3, for coupling the paddle arm 108 to the table support 204, to the leveling assembly 302, or a combination thereof. In some embodiments, the table support 204 may be attached to the paddle arm 108 using the paddle arm tab 202, a friction hinge 406, other suitable components of the table assembly 106, or a combination thereof. The friction hinge 406 may include screws, bolts, rivets or other mechanical or chemical fasteners. The paddle arm tab 202 may be used to pivotably connect the paddle arm 108 and the table support 204 between the first end 218 of the table support 204 and the second end 220 of the table support 204.

The paddle arm tab 202 may include an upper surface 502 that may contact the lower surface 501 of the latch 304 for coupling the paddle arm 108 to the leveling assembly 302, the table support 204, or other suitable component of the table assembly 106. In some embodiments, the upper surface 502 of the paddle arm tab 202 may contact the lower surface 501 of the latch 304 at a second tilt angle within the allowable tilt angle range of the table support 204 and between the bottom side 216 of the table 104 and the bottom side 312 of the table support 204.

As previously mentioned, the leveling assembly 302 may include the latch adjuster 206. In some embodiments, the latch adjuster 206 may include a set screw or other similar component for allowing the latch adjuster 206 to control the first tilt angle of the table support 204 with respect to the paddle arm 108. The set screw, or other suitable component of the latch adjuster 206, may be threadably engaged with the table support 204 and may be adjusted such that a height of the set screw, or other suitable component of the latch adjuster 206, within the latch receiving area 402 may be adjusted. The latch adjuster 206 may selectively engage the recess of the bottom side 412 of the first end 306 of the latch 304 and may be adjusted inward, outward, or in other suitable directions for controlling the first tilt angle of the table support 204.

In certain embodiments, the latch adjuster 206 may engage the latch 304 proximate to the first end 306 of the latch 304 at the first tilt angle within an allowable tilt angle range of the leveling assembly 302. In some embodiments, the latch adjuster 206 may engage the bottom side 412 of the latch 304 proximate to the first end 306 of the latch 304 at the first tilt angle in the allowable tilt angle range of the table support 204. The paddle arm tab 202 may engage the latch 304 proximate to the second end 308 of the latch 304 at a second tilt angle within the allowable tilt angle range of the leveling assembly 302. In some embodiments, the paddle arm tab 202 may engage the bottom side 412 of the latch 304 proximate to the second end 308 of the latch 304 at the second tilt angle within the allowable tilt range of the table support 204.

In some embodiments, the first tilt angle, which may be controllable by the latch adjuster 206, may be a maximum tilt angle downwards of the table support 204 with respect to the paddle arm 108. Additionally, the second tilt angle may be a maximum tilt angle upwards of the table support 204 with respect to the paddle arm 108. In some embodiments, at the second tilt angle within the allowable tilt angle range, the latch adjuster 206 may be disengaged from the first end 306 of the latch 304.

In some embodiments, and as illustrated in FIG. 5, the table support 204 may include a first mating location 504 and a second mating location 506. The first mating location 504 may be positioned between the latch 304 and the first end 218 of the table support 204. The second mating location 506 may be positioned between the latch 304 and the second end 220 of the table support 204. The first mating location 504 and the second mating location 506 may be used to engage the table 104. For example, one or more coupling devices, such as screws, bolts, rivets or other mechanical or chemical fasteners, may be used to couple the table support 204 and the table 104.

As best illustrated in FIGS. 3-4, the table support 204, the leveling assembly 302, or other suitable assembly may optionally include a stowage pin 350. The stowage pin 350 may allow the table 104 to be stowed in the passenger seat arm 102 or in other suitable locations. The stowage pin 350 may perform other suitable operations for allowing the table 104 to be stowed, deployed, etc. In some embodiments, when deployed, the stowage pin 350 may be positioned in a stowage pin receiving area 352 that may be positioned on the top side 310 of the table support 204.

Each of the components of the table assembly 106 (e.g., the paddle arm 108, the table support 204, the leveling assembly 302, etc.) may be formed via various manufacturing processes as desired. Suitable manufacturing processes include, but are not limited to, machining, forging, casting, printing, molding, combinations thereof, or other suitable processes as desired. In some embodiments, the manufacturing process used to form one component may be different from the manufacturing process used to form another component.

Figure 6:
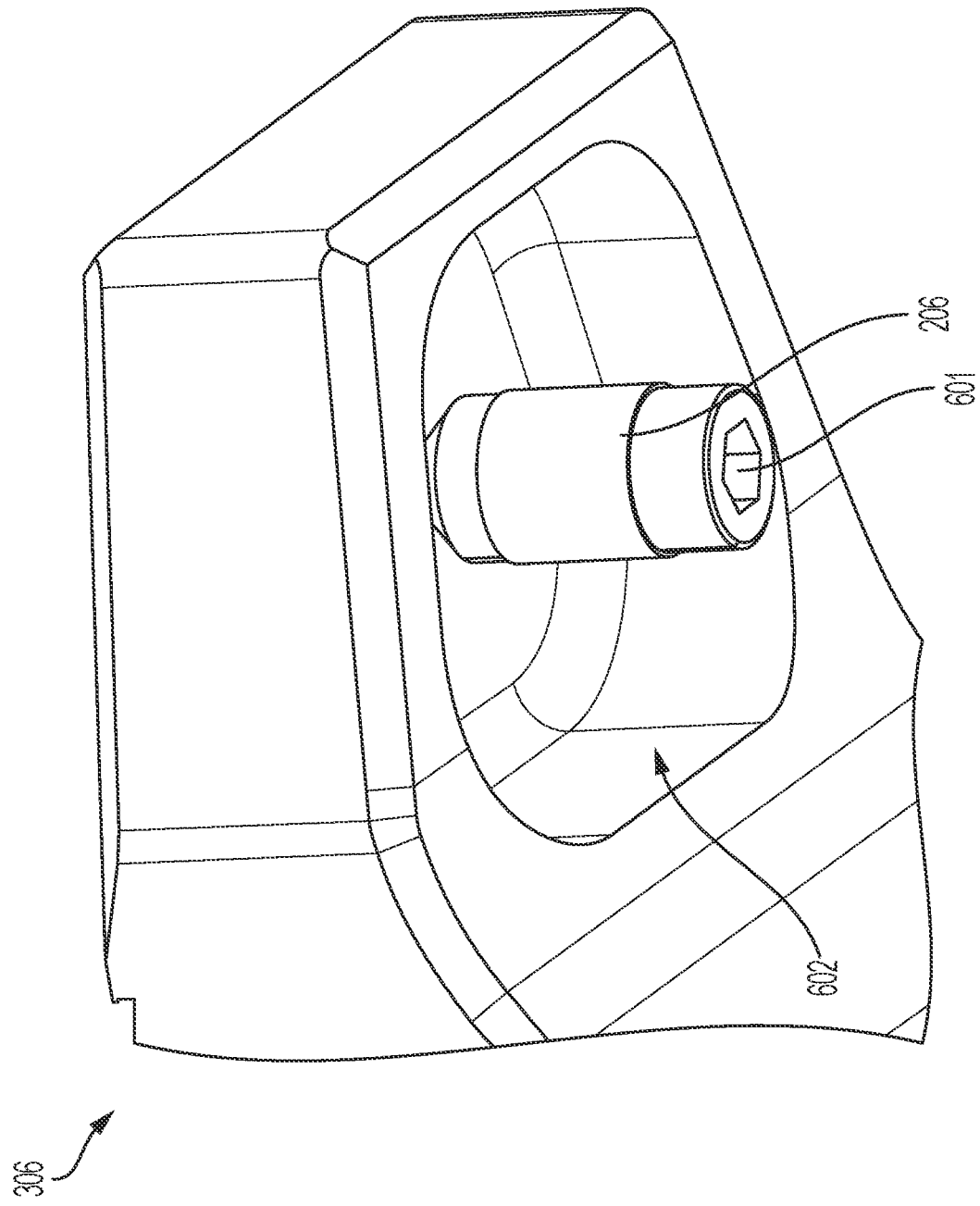
FIG. 6 is a bottom perspective view of a latch according to certain embodiments of the present disclosure.

FIG. 6 is a bottom perspective view of the latch 304 according to certain embodiments of the present disclosure. The bottom side 412 of the latch 304 may be engaged by the latch adjuster 206, and the latch adjuster 206 may include a set screw 601 or other suitable type of adjustable, mechanical coupler. The latch adjuster 206 may be positioned for engaging the recess 602 of the bottom side 412 of the first end 306 of the latch 304. A height of the latch adjuster 206 may be adjusted, which may cause the first tilt of the table support 204 to be adjusted.

In the following, further examples are described to facilitate the understanding of the invention:

Example 1. A table assembly for a passenger seat, the table assembly comprising: a paddle arm comprising a first end and a second end opposite from the first end, wherein the first end comprises a paddle arm tab extending outwards from the paddle arm; a table support pivotably connected to the first end of the paddle arm and configured to support a table of the table assembly, wherein the table support comprises a top side and a bottom side, and wherein the top side defines a latch receiving area; and a leveling assembly comprising: a latch comprising a first end, a second end, wherein the latch is pivotably supported on the table support within the latch receiving area between the first end and the second end of the latch; and a latch adjuster configured to selectively engage the first end of the latch, wherein the latch adjuster is configured to control a tilt angle range of the table support relative to the paddle arm, wherein, the latch adjuster is configured to engage the latch proximate to the first end of the latch at a first tilt angle within the tilt angle range, and wherein the paddle arm tab is configured to engage the latch proximate to the second end of the latch at a second tilt angle within the tilt angle range.

Example 2. The table assembly of any of the preceding or subsequent examples or combination of examples, further comprising the table, wherein the table comprises a first side end, a second side end, a top side, and a bottom side, and wherein the table support is connected to the bottom side of the table between the first side end and the second side end, and wherein the top side of the table support is positioned adjacent to the bottom side of the table.

Example 3. The table assembly of any of the preceding or subsequent examples or combination of examples, wherein the bottom side of the table support extends parallel to the top side of the table.

Example 4. The table assembly of any of the preceding or subsequent examples or combination of examples, wherein the paddle arm tab comprises an upper surface, wherein the latch comprises an upper surface and a lower surface, and wherein the upper surface of the paddle arm tab contacts the lower surface of the latch.

Example 5. The table assembly of any of the preceding or subsequent examples or combination of examples, wherein, at the second tilt angle, the upper surface of the paddle arm tab contacts the lower surface of the latch and between the bottom side of the table and the bottom side of the table support.

Example 6. The table assembly of any of the preceding or subsequent examples or combination of examples, wherein the latch further comprises a top side and a bottom side, wherein the latch adjuster is configured to engage the bottom side of the latch proximate to the first end of the latch at the first tilt angle, and wherein the paddle arm tab is configured to engage the bottom side of the latch proximate to the second end at the second tilt angle.

Example 7. The table assembly of any of the preceding or subsequent examples or combination of examples, wherein the bottom side of the latch further comprises a recess proximate to the first end, and wherein the latch adjuster is configured to engage the bottom side of the latch within the recess.

Example 8. The table assembly of any of the preceding or subsequent examples or combination of examples, wherein the paddle arm comprises a body comprising the first end and the second end, and wherein the paddle arm tab extends from the body such that the paddle arm tab is not parallel to the paddle arm.

Example 9. The table assembly of any of the preceding or subsequent examples or combination of examples, further comprising a support pin pivotably supporting the latch on the table support.

Example 10. The table assembly of any of the preceding or subsequent examples or combination of examples, wherein the first tilt angle is a maximum tilt angle downwards of the table support relative to the paddle arm, and wherein the second tilt angle is a maximum tilt angle upwards of the table support relative to the paddle arm.

Example 11. The table assembly of any of the preceding or subsequent examples or combination of examples, wherein the latch adjuster comprises a set screw threadably engaged with the table support, and wherein the set screw is adjustable such that a height of the set screw within the latch receiving area is adjustable.

Example 12. The table assembly of any of the preceding or subsequent examples or combination of examples, wherein the table support is attached to the paddle arm via a friction hinge.

Example 13. The table assembly of any of the preceding or subsequent examples or combination of examples, wherein the table support further comprises a first end and a second end, wherein the latch is pivotably supported on the table support between the first end and the second end of the table support, and wherein the paddle arm is pivotably connected to the table support between the first end and the second end of the table support.

Example 14. The table assembly of any of the preceding or subsequent examples or combination of examples, wherein the table support further comprises a first mating location between the latch and the first end of the table support and a second mating location between the latch and the second end of the table support, and wherein the first mating location and the second mating location are each configured to engage the table.

Example 15. A passenger seat assembly comprising: an armrest; and the table assembly of any of the preceding or subsequent examples or combination of examples, wherein the second end of the paddle arm is pivotably connected to the armrest.

Example 16. A table assembly for a passenger seat, the table assembly comprising: a table support connectable with a paddle arm and configured to support a table of the table assembly, wherein the table support comprises a top side and a bottom side, and wherein the top side defines a latch receiving area; and a leveling assembly comprising: a latch comprising a first end, a second end, wherein the latch is pivotably supported on the table support within the latch receiving area between the first end and the second end of the latch; and a latch adjuster configured to selectively engage the first end of the latch, wherein the latch adjuster is configured to control a tilt angle range of table support relative to the paddle arm, wherein the latch adjuster is engaged proximate to the first end of the latch at a first tilt angle within the tilt angle range, and wherein the latch adjuster is disengaged from the first end of the latch at a second tilt angle within the tilt angle range.

Example 17. The table assembly of any of the preceding or subsequent examples or combination of examples, further comprising the paddle arm, wherein the paddle arm comprises a first end and a second end opposite from the first end, wherein the first end comprises a paddle arm tab extending outwards from the paddle arm, and wherein the paddle arm tab is configured to engage the latch proximate to the second end of the latch at the second tilt angle.

Example 18. A table assembly for a passenger seat, the table assembly comprising: a table comprising a first side end, a second side end, a top side, and a bottom side; and a table support connected to the bottom side of the table between the first side end and the second side end and connectable with a paddle arm, wherein the table support comprises a top side and a bottom side, and wherein the top side is positioned adjacent to the bottom side of the table and defines a latch receiving area; and a leveling assembly comprising: a latch comprising a first end, a second end, wherein the latch is pivotably supported on the table support within the latch receiving area between the first end and the second end of the latch; and a latch adjuster configured to selectively engage the first end of the latch, wherein the latch adjuster is configured to control a tilt angle range of table support relative to the paddle arm, wherein, the latch adjuster is configured to engage the latch proximate to the first end of the latch at a first tilt angle within the tilt angle range, and wherein the latch adjuster is disengaged from the first end of the latch at a second tilt angle within the tilt angle range.

Example 19. The table assembly of any of the preceding or subsequent examples or combination of examples, further comprising the paddle arm, wherein the paddle arm comprises a first end and a second end opposite from the first end, wherein the first end comprises a paddle arm tab extending outwards from the paddle arm, and wherein the paddle arm tab is configured to engage the latch proximate to the second end of the latch at the second tilt angle.

Example 20. The table assembly of any of the preceding or subsequent examples or combination of examples, wherein the latch adjuster comprises a set screw threadably engaged with the table support, and wherein the set screw is adjustable such that a height of the set screw within the latch receiving area is adjustable.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A table assembly for a passenger seat, the table assembly comprising:
   a paddle arm comprising a first end and a second end opposite from the first end, wherein the first end comprises a paddle arm tab extending outwards from the paddle arm;
   a table support pivotably connected to the first end of the paddle arm and configured to support a table of the table assembly, wherein the table support comprises a top side and a bottom side, and wherein the top side defines a latch receiving area; and
   a leveling assembly comprising:
      a latch comprising a first end, a second end, wherein the latch is pivotably supported on the table support within the latch receiving area between the first end and the second end of the latch; and a latch adjuster configured to control a tilt angle range of the table support relative to the paddle arm by selectively engaging the latch, wherein, when the table support is at a first tilt angle relative to the paddle arm and within the tilt angle range, the latch adjuster is engaged with the latch proximate to the first end of the latch, and wherein, when the table support is at a second tilt angle relative to the paddle arm and within the tilt angle range, the paddle arm tab is engaged with the latch proximate to the second end of the latch.

2. The table assembly of claim 1, further comprising the table, wherein the table comprises a first side end, a second side end, a top side, and a bottom side, and wherein the table support is connected to the bottom side of the table between the first side end and the second side end, and wherein the top side of the table support is positioned adjacent to the bottom side of the table.

3. The table assembly of claim 2, wherein the bottom side of the table support extends parallel to the top side of the table.

4. The table assembly of claim 1, wherein the paddle arm tab comprises an upper surface, wherein the latch comprises an upper surface and a lower surface, and wherein the upper surface of the paddle arm tab contacts the lower surface of the latch.

5. The table assembly of claim 4, wherein, at the second tilt angle, the upper surface of the paddle arm tab contacts the lower surface of the latch and between the bottom side of the table and the bottom side of the table support.

6. The table assembly of claim 1, wherein the latch further comprises a top side and a bottom side, wherein the latch adjuster is configured to engage the bottom side of the latch proximate to the first end of the latch at the first tilt angle, and wherein the paddle arm tab is configured to engage the bottom side of the latch proximate to the second end at the second tilt angle.

7. The table assembly of claim 6, wherein the bottom side of the latch further comprises a recess proximate to the first end, and wherein the latch adjuster is configured to engage the bottom side of the latch within the recess.

8. The table assembly of claim 1, wherein the paddle arm comprises a body comprising the first end and the second end, and wherein the paddle arm tab extends from the body such that the paddle arm tab is not parallel to the paddle arm.

9. The table assembly of claim 1, further comprising a support pin pivotably supporting the latch on the table support.

10. The table assembly of claim 1, wherein the first tilt angle is a maximum tilt angle downwards of the table support relative to the paddle arm, and wherein the second tilt angle is a maximum tilt angle upwards of the table support relative to the paddle arm.

11. The table assembly of claim 1, wherein the latch adjuster comprises a set screw threadably engaged with the table support, and wherein the set screw is adjustable such that a height of the set screw within the latch receiving area is adjustable.

12. The table assembly of claim 1, wherein the table support is attached to the paddle arm via a friction hinge.

13. The table assembly of claim 1, wherein the table support further comprises a first end and a second end, wherein the latch is pivotably supported on the table support between the first end and the second end of the table support, and wherein the paddle arm is pivotably connected to the table support between the first end and the second end of the table support.

14. The table assembly of claim 13, wherein the table support further comprises a first mating location between the latch and the first end of the table support and a second mating location between the latch and the second end of the table support, and wherein the first mating location and the second mating location are each configured to engage the table.

15. A passenger seat assembly comprising:
an armrest; and
the table assembly of claim 1, wherein the second end of the paddle arm is pivotably connected to the armrest.

16. A table assembly for a passenger seat, the table assembly comprising:
a table support connectable with a paddle arm and configured to support a table of the table assembly, wherein the table support comprises a top side and a bottom side, and wherein the top side defines a latch receiving area; and
a leveling assembly comprising:
a latch comprising a first end, a second end, wherein the latch is pivotably supported on the table support within the latch receiving area between the first end and the second end of the latch; and
a latch adjuster configured to selectively engage the first end of the latch, wherein the latch adjuster is configured to control a tilt angle range of table support relative to the paddle arm,
wherein, when the table support is at a first tilt angle within the tilt angle range relative to the paddle arm, the latch adjuster is engaged with the latch proximate to the first end of the latch, and
wherein, when the table support is at a second tilt angle within the tilt angle range relative to the paddle arm, the latch adjuster is disengaged from the first end of the latch.

17. The table assembly of claim 16, further comprising the paddle arm, wherein the paddle arm comprises a first end and a second end opposite from the first end, wherein the first end comprises a paddle arm tab extending outwards from the paddle arm, and wherein the paddle arm tab is configured to engage the latch proximate to the second end of the latch at the second tilt angle.

18. A table assembly for a passenger seat, the table assembly comprising:
a table comprising a first side end, a second side end, a top side, and a bottom side; and
a table support connected to the bottom side of the table between the first side end and the second side end and connectable with a paddle arm, wherein the table support comprises a top side and a bottom side, and wherein the top side is positioned adjacent to the bottom side of the table and defines a latch receiving area; and
a leveling assembly comprising:
a latch comprising a first end, a second end, wherein the latch is pivotably supported on the table support within the latch receiving area between the first end and the second end of the latch; and
a latch adjuster configured to selectively engage the first end of the latch, wherein the latch adjuster is configured to control a tilt angle range of table support relative to the paddle arm,
wherein, the latch adjuster is configured to engage the latch proximate to the first end of the latch at a first tilt angle within the tilt angle range, and wherein the latch adjuster is disengaged from the first end of the latch at a second tilt angle within the tilt angle range.

19. The table assembly of claim 18, further comprising the paddle arm, wherein the paddle arm comprises a first end and a second end opposite from the first end, wherein the first end comprises a paddle arm tab extending outwards from the paddle arm, and wherein the paddle arm tab is configured to engage the latch proximate to the second end of the latch at the second tilt angle.

20. The table assembly of claim 18, wherein the latch adjuster comprises a set screw threadably engaged with the table support, and wherein the set screw is adjustable such that a height of the set screw within the latch receiving area is adjustable.

* * * * *